July 24, 1962
T. H. FIKSE
3,045,999
VEHICLE SUSPENSION SYSTEM
Filed Dec. 12, 1955
3 Sheets-Sheet 1
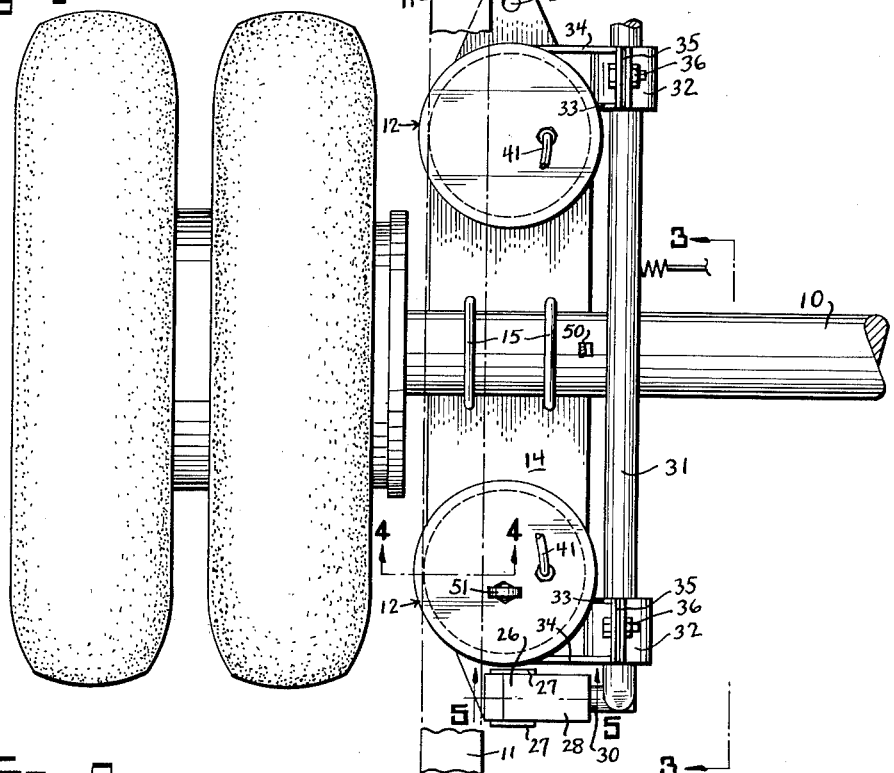
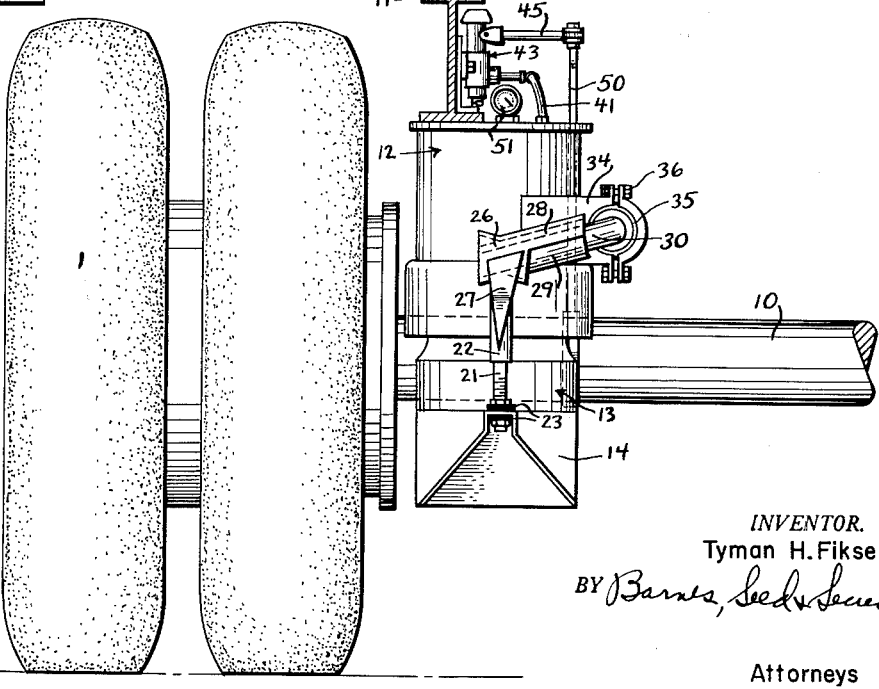
INVENTOR.
Tyman H. Fikse
BY Barnes, Leed & Secrest
Attorneys July 24, 1962 T. H. FIKSE 3,045,999
VEHICLE SUSPENSION SYSTEM
Filed Dec. 12, 1955 3 Sheets-Sheet 2
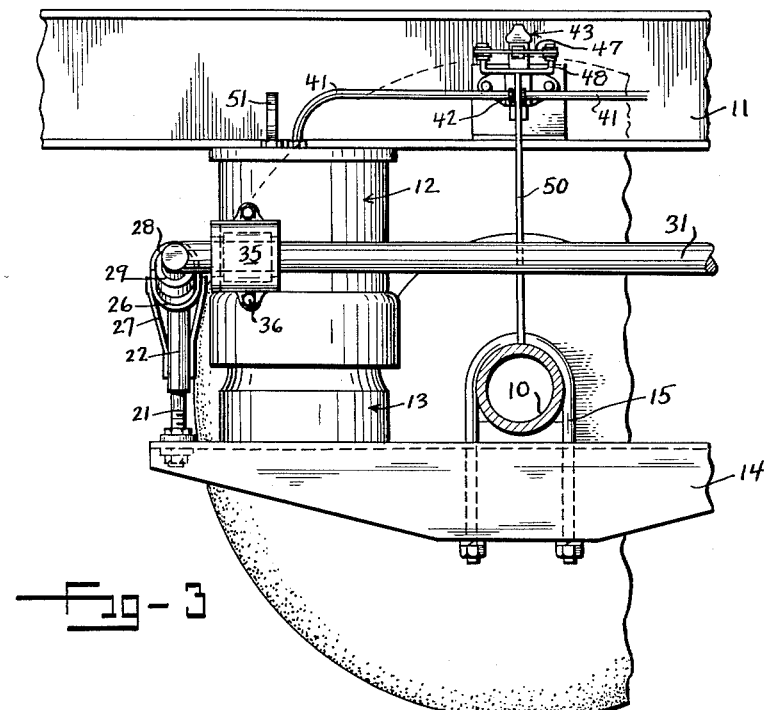
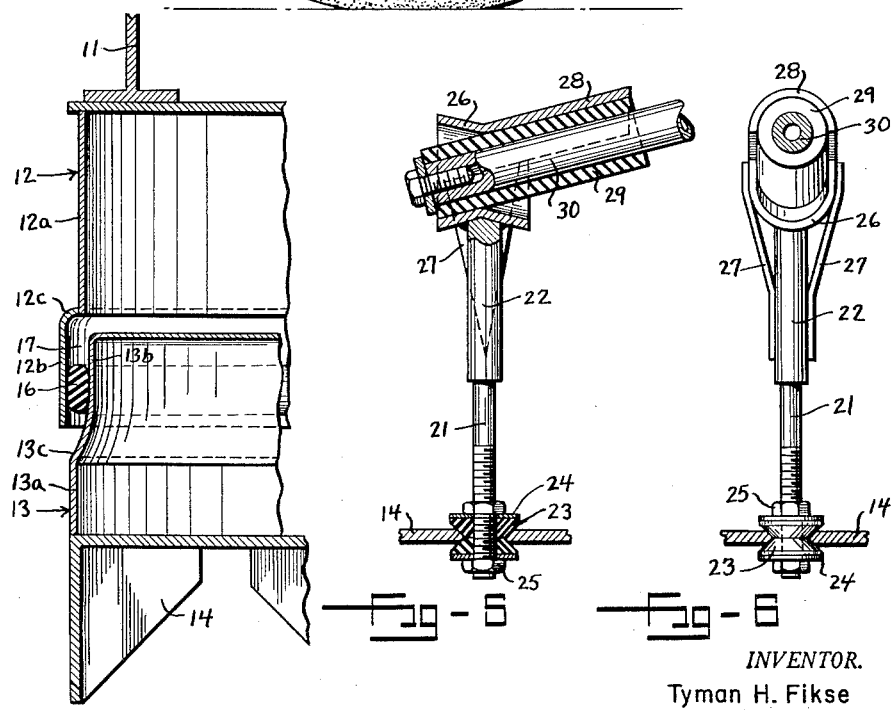
INVENTOR.
Tyman H. Fikse
BY Barnes, Seed & Forest
Attorneys July 24, 1962 T. H. FIKSE 3,045,999
VEHICLE SUSPENSION SYSTEM
Filed Dec. 12, 1955 3 Sheets-Sheet 3
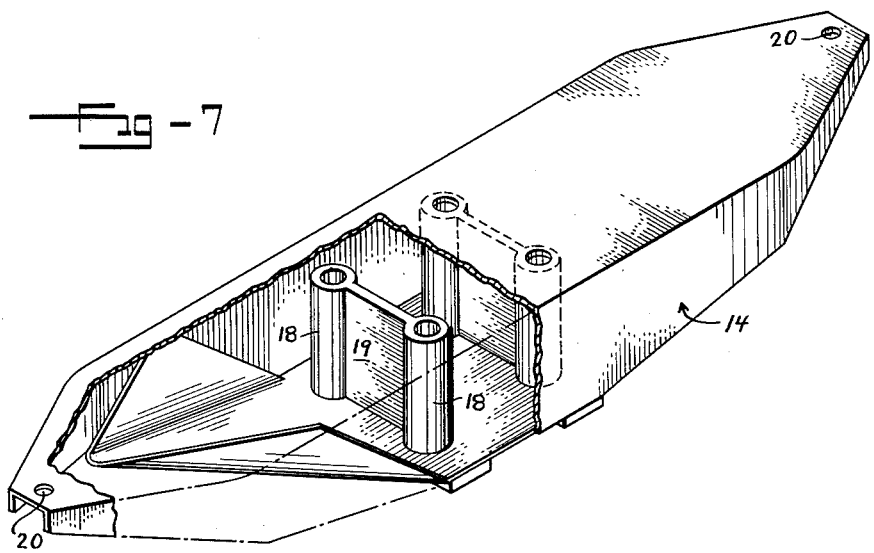
Fig-7
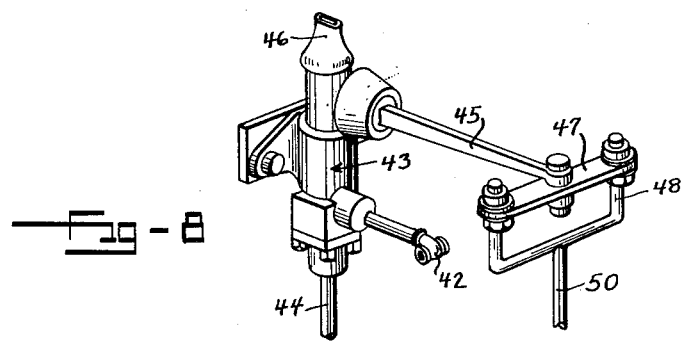
Fig-8
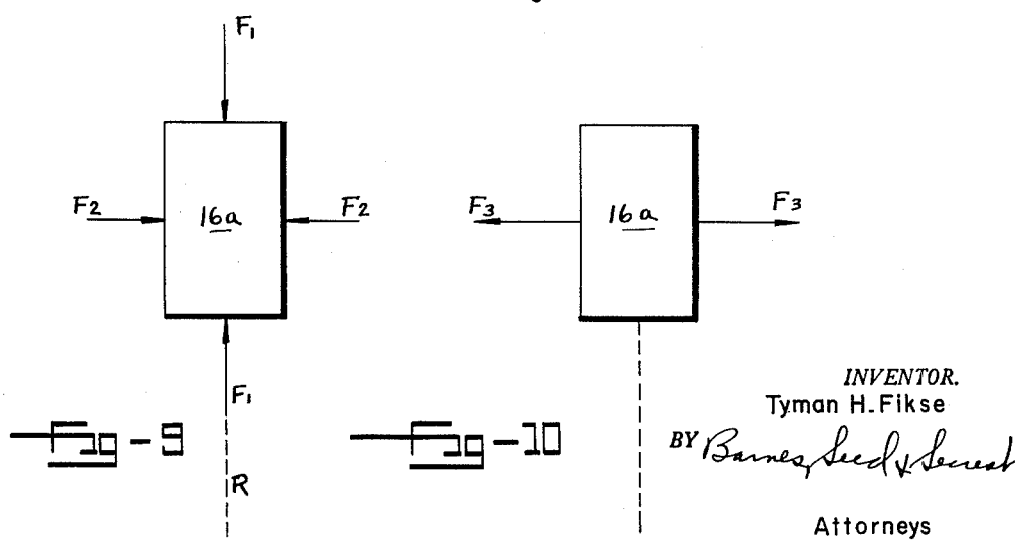
Fig-9    Fig-10
INVENTOR.
Tyman H. Fikse
BY 
Attorneys 3,045,999
VEHICLE SUSPENSION SYSTEM
Tyman H. Fikse, 3400 6th Ave. S., Seattle, Wash.
Filed Dec. 12, 1955, Ser. No. 552,387
5 Claims. (Cl. 267—22)

The present invention relates to suspension systems for vehicles utilizing air springs of the general type disclosed in my copending application, Ser. No. 507,109, filed May 9, 1955, now Patent No. 2,905,459, dated September 22, 1959, and namely, air springs having inner and outer telescoping members having an elastic ring compressed therebetween. One of these telescoping members is supported by the vehicle axle assembly while the other is carried by the vehicle frame and is normally supplied with compressed air or some other pressurized fluid for yieldingly urging the members apart.

An important object of the present invention is to provide such an air spring which can function as a spring by virtue of the elastic ring alone when the compressed air supply is cut off as, for example, is commonly the case when a truck trailer is parked between hauls.

A further important aim of my invention is to provide a system whereby the torsional deflection of the axle due to brake torque is not resisted directly by the telescoping members of the air springs.

With yet additional objects and advantages in view which, with the foregoing, will appear and be understood in the course of the following description and claims, the invention consists in the novel construction and in the adaptation and combination of parts hereinafter described and claimed.

In the accompanying drawings:

FIGURE 1 is a fragmentary top plan view of my spring system mounted at the left end of an axle.

FIG. 2 is a side elevational view looking forwardly with respect to the vehicle frame.

FIG. 3 is a fragmentary longitudinal vertical sectional view taken as indicated by the line 3—3 of FIG. 1.

FIG. 4 is an enlarged fragmentary vertical sectional view taken as indicated by the line 4—4 of FIG. 1.

FIG. 5 is an enlarged fragmentary vertical sectional view taken along line 5—5 of FIG. 1.

FIG. 6 is an enlarged vertical sectional view taken through the root end of one of the lever arms and illustrating the structure shown in FIG. 5 as viewed from the right side.

FIG. 7 is a perspective view with parts broken away of the axle beam.

FIG. 8 is a perspective view of the control valve assembly.

FIGS. 9 and 10 illustrate the compressive and tensile forces respectively, acting in a segment of the elastic ring.

In the drawings I have illustrated a pair of my spring units carrying the left end of an axle 10 beneath a vehicle frame assembly having a left longitudinal frame rail 11. Each spring unit has an outer can 12 which is rigidly suspended from the rail 11 as part of the vehicle frame assembly and is telescopically associated with an inner can 13. These inner cans 13 are in turn rigidly mounted on respective ends of a longitudinally extending axle beam 14 and together with the latter comprise a beam assembly. U-bolts 15 clamp the axle 10 onto the beam 14. The cans 12, 13 are spaced apart radially speaking and have an elastic rubber ring 16 wedged between their telescoping portions which seals off an annular pressure chamber 17 surrounding part of the length of the inner can 13.

The axle beam 14 may be fabricated from sheet stock and be of two-piece hollow construction as best shown in FIG. 4. For receiving the U-bolts 15 there is provided two longitudinally spaced pairs of pipe braces 18 with each pair being joined by a respective plate brace 19.

The axle beam tapers upwardly and inwardly at its ends and presents terminal holes 20 for receiving studs 21 which project downwardly from within hollow rods 22. Sleeved on the lower end of each stud 21 is a pair of rubber grommets 23 having tapered ends which meet within the hole 20 to keep the stud out of direct contact with the beam. Metal washers 24 separate the grommets from a pair of hold-down nuts 25 for the stud. Welded to the upper end of each rod 22 is the socket 26 of an elastic elbow joint which extends parallel to the axle 10. Triangular braces 27 strengthen this connection. Each socket 26 is open at both ends with the latter being vertically flared with respect to a circular center cross-section. Accordingly, the horizontal dimension of the socket remains constant while the vertical dimension gradually increases toward the ends of the socket whereat the cross-section is generally elliptical with the vertical dimension being the major axis. Sloping upwardly as a stop from the inner end of the socket 26 is a semi-cylindrical prolongation 28.

A rubber sleeve 29 is received in each socket 26 and is fitted into a respective lever arm 30. The sleeve has an outside diameter corresponding to the inside horizontal dimension of the socket and a length desirably as great as the combined lengths of the socket and stop 28. The lever arms 30 extend in parallel relation perpendicularly from the ends of a torque rod 31 which extends longitudinally of the frame on the inboard side of the spring units.

The torque rod 31 is elastically journaled in a pair of two-piece bearing blocks 32 which are secured by sets of inwardly projecting gussets 33, 34 to the outer cans 12. Rubber bushing halves 35 within the bearing blocks are clamped around the torque rod by means of bolts 36.

Directing attention to FIG. 4 it will be seen that each inner can 13 has a cylindrical base portion 13a welded at the bottom to the upper face of the beam 14 and a reduced head portion 13b. This head portion is closed at the top and is cylindrical for approximately the upper half of its length after which it gradually increases in diameter until it merges by a rounded annular shoulder 13c with the base portion 13a.

Each outer can 12 is inverted in that it has a depending cylindrical base portion 12a with a top closure plate 38 having a weld connection with the underside of the longitudinal frame rail 11 and a respective cross-frame member 40. The inside diameter of this base portion 12a is slightly greater than the outside diameter of the reduced cylindrical part of the inner can's head portion 13b. An annular rounded shoulder portion 12c joins the base portion 12a with an enlarged cylindrical head portion 12b which has an inside diameter slightly larger than the outside diameter of the base portion 13a of the inner can. This shoulder 12c is desirably concave with respect to the inside of the outer can.

The elastic ring 16 has a cross-sectional diameter when relaxed which may be approximately twice the clearance between the head portion 12b of the outer can and the cylindrical top part of the head portion 13b of the inner can and as a result the ring is considerably radially compressed between the cans 12, 13, and this radial compression causes compression of the ring circumferentially thereof. To offset this circumferential compression I pretension the ring by stretching it over the inner can. In other words, the relaxed inside diameter of the ring is less than the smallest outside diameter of the inner can a sufficient amount that ahe ring in order to be stretched over the inner can, must be tensioned to a value at least as great as the maximum tangential compression caused by radial compression of the ring. These compressive and tensile forces have been illustrated in FIGS. 9 and 10 in which a ring segment is denoted 16a and the broken line R is a radius of the ring. The arrows $F_1$ represent the radial compressive forces caused by a compression of the ring between the inner and outer cans, and the arrows $F_2$ denote the circumferential compressive forces resulting from such forces $F_1$. These latter forces, if not counteracted, could cause a warping of the ring out of a transverse plane. Arrows $F_3$ represent the circumferential tensile forces resulting from the stretching of the ring over the inner can and it is preferable that these tensile forces exceed the circumferential compressive forces $F_2$.

The outer cans 12, and hence the annular pressure chambers 17 sealed off by the ring 16, are supplied with compressed air or some other pressurized fluid through a pair of tubes 41 leading to respective openings in the top plate 38 of the cans. These tubes 41 merge at a T-fitting 42 which is connected to a two-way slide control valve 43 mounted on the inside face of the frame rail 11. Directing attention to FIG. 7, the bore of this valve 43 is connected at its lower end with a supply line 44 leading, for example, from the vehicle's air brake system. The valve has a control arm 45 for positioning the slide valve between two positions, a fill position causing the tubes 41 to the outer cans 12 to receive fluid from the supply line 44, and a dump position blocking off the supply line and causing the tubes 41 to vent through a discharge fitting 46 to the atmosphere. At its outer end the control arm 45 has a bolt connection with a fiber piece 47 bridging the forks 48 at the head of an upright forked rod 50 which is rigidly connected at its lower end to the axle 10. When the control arm 45 is caused to pivot upwardly from a substantially horizontal neutral position in response to downward movement of the vehicle frame relative to the axle 10, the valve reaches its fill position causing the pressure in the pressure chambers 17 to be increased. Conversely, when the control arm 45 pivots downwardly responsive to upward movement of the vehicle frame relative to the axle the valve assumes its dump position causing a lowering of pressure in the pressure chambers. In this manner the spacing of the axle below the vehicle frame when the vehicle is at rest can be maintained at a predetermined constant value independent of the static load on the vehicle.

The action of the elastic ring 16 in each spring unit will now be explained in detail. As shown in FIG. 4, the ring is normally seated between the lower beveled part of the inner can's head portion 13b and the head portion 12b of the related outer can and the load of the vehicle frame on the outer can of course causes a deformation of the ring as it is squeezed between the two cans. When the vehicle wheels strike a raised irregularity in the roadbed the effect is for the inner and outer cans of each spring unit to attempt to telescope further together due to the resulting shock load. Such movement is yieldingly resisted by the compressed air in the pressure chamber 17 and by the ring 16. If the load is severe enough the annular shoulder 12c, 13c may have to engage the ring top and bottom and vertically compress the ring therebetween as shown by the broken line positions in FIG. 4 in order to absorb the load.

It is of utmost importance to understand that as the cans telescope further together, or on the other hand, further apart, the ring 16 does not slide, but turns about its centroidal axis. By the term centroidal axis is meant the circle which is the locus of the centroids of all radial cross-sectional increments of the ring that can be taken at any particular instant of time. It will therefore be apparent that the centroidal axis varies along with the amount of deformation of the ring. To elaborate in the turning of the ring, in the instance wherein the inner and outer cans are telescoping further together, the portions of the ring above the plane of its centroidal axis will turn toward the center of the ring whereas those portions below such plane will turn away from the center of the ring. Likewise, when the inner and outer cans move further apart to assume their neutral position or because of a depression in the roadbed, the ring will turn about its centroidal axis in the opposite manner, that is, the portions of the ring above the plane of its centroidal axis will turn away from the center of the ring and those portions below such plane will turn toward the center of the ring. It thus becomes apparent that the elastic ring 16 by so turning about its centroidal axis, helps to absorb part of the load, and in fact, the ring 16 can assume the entire load by the shoulder 13c bottoming on the ring if, for example, the supply of compressed air is cut off.

Also of significant importance, is the fact that the ring 16 can absorb loads which tend to move the vehicle frame laterally with respect to the axle 10. Imagine that the vehicle shown fragmentarily in the drawings were making a right turn around a steeply banked curve. This would cause the vehicle frame to lean and shift to the right with respect to the wheels and axle, and hence the outer cans 12 would be forced to the right with respect to the inner cans 13. Yieldingly resisting those force would be the right-hand half of each ring 16 as viewed in FIG. 1. These right-hand halves would of course be compressed by this lateral load but the seal of the pressure chamber would not be broken since the left-hand halves of the rings would responsively expand to fill the increased gap between the inner and outer cans occurring on the left-hand side thereof. During this right turn the outer cans 12 at the left side of the vehicle also would move upwardly with respect to the inner cans 13 and the amount of such upward vertical movement is limited by the stops 28 acting on the lever arms 30 through the elastic sleeves 29.

To understand the operation of the torsion rod it should be kept in mind that when the wheels of the vehicle are braked, the resulting brake torque tends to turn the axle 10 in the clockwise direction as viewed in FIG. 3. As a consequence there is a tendency for the forward end of the axle beam 14 to move downwardly, and hence for the rear end of the beam to move upwardly. Accordingly, the cans of the forward spring unit will tend to telescope further apart and the cans of the rear spring unit will tend to telescope further together. These telescoping tendencies of the cans will cause the forward lever arms 30 to exert a counterclockwise torque on the torsion rod when viewed from the rear and the rear lever arms to exert an opposing clockwise torque. As a result the axle beam 14 is maintained in substantially parallel relation to the vehicle frame.

As the outer and inner cans 12, 13 of the spring units move relative to one another vertically in response to changes in load or to brake torque they can maintain a concentric relation, even though interconnected with the lever arms 30 primarily because of the elasticity of sleeves 29, and secondarily because of the elasticity of the bushings 35 and grommets 23. The elasticity of these parts also permits the cans to move slightly with respect to one another transversely of the vehicle when the rings 16 absorb those loads which tend to move the vehicle frame laterally as discussed above.

It will be appreciated that in a tandem axle vehicle it would be desirable to feed all of the air springs at one side of the vehicle from a common manifold controlled by a single control valve 43 which is located such that it senses the mean movement of the axles. This will assure an equal weight distribution in an uneven terrain.

A pressure gauge 51 may be inserted in the system to record the fluid pressure acting on the elastic rings 16. The pressure reading will be a measure of the weight load of the vehicle.

The advantages of the invention, it is thought, will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a spring system, a frame assembly and a beam assembly movable with respect to one another, a pair of parallel spring units spaced apart lengthwise of the frame assembly and each having inner and outer members telescopically associated with one another, said outer members being rigidly mounted on one of said assemblies and said inner members being rigidly mounted on the other of said assemblies, an elastic ring radially compressed between the inner and outer members of each said spring unit, torsion rod means extending lengthwise of the frame assembly and journal mounted on one of said assemblies, and lever means operatively associated with said torsion rod means and the other of the assemblies whereby tilting of the beam assembly with respect to the frame assembly about a transverse axis causes a torsional windup of said torsion rod means for yieldingly resisting such tilting.

2. The structure of claim 1 in which stop means is operatively associated with said other of the assemblies and said lever means and is arranged to be engaged by said lever means for limiting the amount of movement of said inner and outer members apart.

3. In a spring system, a frame assembly and a beam assembly movable with respect to one another, a pair of parallel spring units spaced apart lengthwise of the frame assembly and each having inner and outer members telescopically associated with one another, said outer members being rigidly mounted on one of said assemblies and said inner members being rigidly mounted on the other of said assemblies, an elastic ring radially compressed between the inner and outer members of each said spring unit, a torsion rod extending lengthwise of the frame assembly and having its longitudinal center equidistant from said spring units, said torsion rod being journal mounted on one of said assemblies and having a pair of lever arms which are rigidly connected to its ends and each operatively connected by a respective elastic joint to the other of said assemblies whereby tilting of the beam assembly with respect to the frame assembly about a transverse axis midway between said spring units will be yieldingly resisted by a resulting torsional windup of said torsion rod.

4. In a spring system, a frame assembly and a beam assembly movable with respect to one another, a pair of parallel spring units spaced apart lengthwise of the frame assembly and each having inner and outer members telescopically associated with one another, said outer members being rigidly mounted on one of said assemblies and said inner members being rigidly mounted on the other of said assemblies, an elastic ring radially compressed between the inner and outer members of each said spring unit, a torsion rod extending lengthwise of the frame assembly and having its longitudinal center equidistant from said spring units, said torsion rod being journal mounted on one of said assemblies and having a pair of lever arms which are rigidly connected to its ends and operatively connected to the other of said assemblies whereby tilting of the beam assembly with respect to the frame assembly about a transverse axis midway between said spring unit will be yieldingly resisted by a resulting torsional windup of said torsion rod.

5. In a spring system, a frame assembly and a beam assembly movable with respect to one another, a pair of parallel spring units spaced apart lengthwise of the frame assembly and each having inner and outer members telescopically associated with one another, said outer members being rigidly mounted on one of said assemblies and said inner members being rigidly mounted on the other of said assemblies, an elastic ring radially compressed between the inner and outer members of each said spring unit and adapted to turn about its centroidal axis in response to relative endwise movements between such members, a torsion rod extending lengthwise of the frame assembly and having its longitudinal center equidistant from said spring units, said torsion rod being journal mounted by elastic bearings on one of said assemblies and having a pair of lever arms which are rigidly connected to its ends and operatively connected to the other of said assemblies whereby tilting of the beam assembly with respect to the frame assembly about a transverse axis midway between said spring units will be yieldingly resisted by a resulting torsional windup of said torsion rod.

References Cited in the file of this patent

UNITED STATES PATENTS

| | | |
|---|---|---|
| 2,210,485 | Hawkins | Aug. 6, 1940 |
| 2,290,620 | Brown | July 21, 1942 |
| 2,582,363 | Thiry | Jan. 15, 1952 |
| 2,843,396 | Lucien | July 15, 1958 |

FOREIGN PATENTS

| | | |
|---|---|---|
| 453,213 | Great Britain | June 8, 1935 |
| 1,096,913 | France | Feb. 9, 1955 |

(Corresponding U.S. Patent 2,819,060, Jan. 7, 1958)